3,093,675
PREPARATION OF ALKOXYBOROXINES AND ARYLOXYBOROXINES
James W. Shepherd, Mars, Pa., assignor to Callery Chemical Company, Pittsburgh, Pa., a corporation of Pennsylvania
No Drawing. Filed Feb. 1, 1960, Ser. No. 5,619
6 Claims. (Cl. 260—462)

This invention relates to the preparation of alkoxyboroxines, aryloxyboroxines, and aryloxyalkoxyboroxines and more particularly to their preparation from trimethoxyboroxine and an alcohol or phenol in the presence of trimethyl borate.

Trialkoxyboroxines and triaryloxyboroxines are useful as fire extinguishers, welding fluxes, plasticizers, chemical intermediates and for other purposes such as forming synthetic resins with epoxides. They have previously been prepared by the reaction of anhydrous boric oxide with a borate ester having the desired alkoxy or aryloxy group. This method is disadvantageous in that the necessary borate esters may be expensive and difficult to obtain, and their reaction with boric oxide is frequently difficult to carry out satisfactorily.

Trimethoxyboroxine is readily prepared by a variety of known methods, such as by digestion of boric oxide with trimethyl borate, or by the partial hydrolysis of trimethyl borate.

It is therefore an object of this invention to provide a method of preparing various alkoxyboroxines and aryloxyboroxines from the readily available trimethoxyboroxine.

This invention is based on my discovery that an exchange reaction to form higher alkoxy and aryloxy boroxines occurs when trimethoxyboroxine is contacted with a higher monohydric alcohol, i.e., an alcohol containing more than one carbon atom, or a monohydric phenol, and the methanol formed thereby is continuously removed by azeotropic distillation with trimethyl borate.

Many borate esters have been prepared by transesterification reactions, that is, by reaction of an alcohol with the borate ester according to

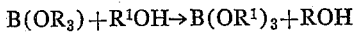

$$B(OR_3) + R^1OH \rightarrow B(OR^1)_3 + ROH$$

where R and $R^1$ are different alkyl radicals. However, when trimethoxyboroxine and an alcohol or phenol are reacted directly, the trialkoxyboroxine structure is substantially destroyed and there is produced boric acids, methyl borate, and the borate ester of the alcohol or phenol used; substantially none of the desired boroxine is produced.

According to this invention, trimethoxyboroxine and the monohydric alcohol or phenol are contacted in the presence of trimethyl borate, and the mixture is distilled to continuously remove overhead trimethyl borate-methanol azeotrope or other mixtures of trimethyl borate and methanol. By this method substantially quantitative yields of the higher alkoxyboroxine or aryloxyboroxine are obtained.

For example, 0.128 mole of phenol (12 g.), 0.041 mole of trimethoxyboroxine, and 0.87 mole of trimethyl borate were charged to a glass still pot. The mixture was heated, and slowly distilled through a Vigreux column until the distillate, a mixture of methanol and trimethyl borate, no longer contained any methanol. This required a period of about 4 hours. The still pot residue was then subjected to a vacuum to remove the remaining volatile material which was substantially trimethyl borate. There then remained 15 g. of a solid product which melted at 75–78° C. This product was substantially pure triphenoxyboroxine and contained 8.36 milliatoms of B/g. compared to the theoretical 8.36 milliatoms of B/g. for triphenoxyboroxine. The yield of triphenoxyboroxine was 100%.

Boroxines containing different alkoxy or aryloxy groups may also be prepared by this method. For example when phenol and trimethoxyboroxine are reacted in the same manner as above, except that only ⅓ mole of phenol is used for each mole of trimethoxyboroxine, there is produced dimethylphenoxyboroxine. Similarly, methoxydiphenoxyboroxine is prepared when ⅔ mole of phenol is used for each mole of trimethoxyboroxine. With intermediate proportions of phenol, mixtures of the methoxyphenoxyboroxines results. This partial exchange may also be accomplished when more than the stoichiometric desired amount of phenol or alcohol is present in the reaction mixture, by terminating the reaction before all the alcohol or phenol is reacted. This is conveniently done by rapidly distilling or evaporating the reactant alcohol or phenol from the mixture. Other conventional methods, such as extreme dilution with an inert solvent, may also be employed. The mixed methoxy alkoxyboroxines or methoxyaryloxyboroxines may then be reacted in the same manner with a different alcohol or phenol to exchange with the remaining methoxy groups.

The higher alcohols which are somewhat less acidic than the phenols react more slowly than the phenols and the degree of higher alkoxy substitution is readily controlled by adjustment of the reaction time. For example, 0.50 mole of trimethoxyboroxine, 1.65 moles of isopropyl alcohol and 3 moles of trimethyl borate were charged to a still pot. The mixture was slowly distilled for about four hours, until the overhead distillate temperature rose above 55° C., the boiling point of methyl borate-methanol azeotrope. The distillation was stopped and the low volatility materials were rapidly removed by vacuum evaporation. The residue was a substantially 100% yield, based on trimethoxyboroxine, of dimethoxyisopropoxyboroxine. With longer reaction times triisopropoxyboroxine is formed. For example, 0.78 mole of trimethoxyboroxine, 2.33 moles of isopropyl alcohol, and 4.66 moles of trimethyl borate were charged to a still pot and refluxed for several hours. The mixture was then very slowly distilled over a period of 17½ hours; the overhead take off rate was adjusted so that the head temperature did not exceed about 55° C., the boiling point of trimethyl borate-methanol azeotrope. The excess trimethyl borate was then distilled over, leaving a pot residue which solidified on cooling. This solid was substantially triisopropoxyboroxine, and had a boron content of 12.2 milliatoms per gram and a carbon content of 33.7 milliatoms per gram, as compared to the theoretical boron and carbon of 11.68 and 34.82 respectively.

In another reaction 32.4 mmols of 1-octadecyl alcohol, 10.8 mmols of trimethoxyboroxine, and 100 mmols of trimethyl borate were refluxed for four hours, and the methyl borate azeotrope was then removed by distillation. The reaction mixture was cooled and unreacted octadecyl alcohol precipitated and was separated. The remainder of the reaction mixture was mixed with hexane, and solid dioctadecoxymethoxyboroxine, melting point 68–70° C., was recrystallized from the solution.

It is necessary to use at least about enough methyl borate to permit the distillative removal of the produced methanol as trimethyl borate-methanol azeotrope. For example, at atmospheric pressure, the azeotrope contains approximately 1 mole of methyl borate for each mole of methanol, and therefore 1 mole of methyl borate is required for each equivalent of —OCH₃ exchanged. Preferably, a substantial excess of methyl borate over this amount is used, e.g. 100–200% excess, or even larger excesses. This facilitates the distillation and decreases the methanol concentration in the reaction mixture. If desired, the methyl borate-methanol distillate removed may be richer in methyl borate than the azeotrope, provided there is a correspondingly larger amount of methyl borate used in the reaction.

According to the provisions of the patent statutes, I have explained the principle and mode of practicing my invention, and have described what I now consider to be its best embodiments. However, I desire to have it understood that within the scope of the appended claims, the invention may be practiced otherwise than as specifically described.

I claim:

1. A method of preparing an organoxyboroxine of the formula $B_3O_3(OR)(OR^1)(OR^2)$ in which OR, $OR^1$ and $OR^2$ are selected from the group consisting of alkoxy and aryloxy radicals, which comprises reacting an organoxyboroxine of the formula $B_3O_3(OCH_3)(OR)(OR^1)$, where OR and $OR^1$ are selected from the group consisting of alkoxy and aryloxy radicals, with a compound of the formula ROH, where R is selected from the group consisting of aryl radicals and alkyl radicals having at least 2 carbon atoms, in the presence of at least sufficient trimethylborate to form an azeotrope with the produced methanol, distilling methanol and trimethylborate from the reaction mixture, and recovering the organoxyboroxine formed.

2. A method according to claim 1 in which a substantial excess of trimethylborate is used.

3. A method of preparing a trialkoxyboroxine, $B_3O_3(OR)_3$ in which OR is an alkoxy group containing at least two carbon atoms, which comprises reacting trimethoxyboroxine with a compound of the formula ROH where R is an alkyl radical having at least two carbon atoms in the presence of trimethyl borate, using at least three moles of alcohol and three moles of trimethylborate for each mole of trimethoxyboroxine, distilling produced methanol and trimethyl borate from the reaction mixture and recovering the trialkoxyboroxine formed.

4. A method of preparing a triaryloxyboroxine which comprises reacting trimethoxyboroxine with a compound of the formula ROH where R is an aryl radical in the presence of trimethylborate, using at least three moles of said compound and three moles of trimethyl borate for each mole of trimethoxyboroxine, distilling produced methanol and trimethylborate from the reaction mixture, and recovering the triaryloxyboroxine formed.

5. A method according to claim 4 in which said compound is phenol and the organoboroxine formed is triphenoxyboroxine.

6. An organoxyboroxine of the formula $$B_3O_3(OR)(OR^1)(OR^2)$$

in which OR is an alkoxy group, $OR^1$ is an aryloxy group and $OR^2$ is selected from the group consisting of alkoxy and aryloxy groups.

References Cited in the file of this patent

UNITED STATES PATENTS

| | | |
|---|---|---|
| 2,787,329 | Schechter | Apr. 2, 1957 |
| 3,030,196 | Dykstra | Apr. 17, 1962 |

OTHER REFERENCES

Lappert: J. Chemical Society (London), pages 2790–1 (1958).